(12) United States Patent
Woloschyn (10) Patent No.: US 8,830,485 B2
(45) Date of Patent: Sep. 9, 2014

(54) DEVICE FOR OPTICALLY SCANNING AND MEASURING AN ENVIRONMENT

(71) Applicant: FARO Technologies, Inc., Lake Mary, FL (US)

(72) Inventor: Andreas Woloschyn, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/967,504

(22) Filed: Aug. 15, 2013

(65) Prior Publication Data

US 2014/0049784 A1 Feb. 20, 2014

Related U.S. Application Data

(60) Provisional application No. 61/714,773, filed on Oct. 17, 2012.

(30) Foreign Application Priority Data

Aug. 17, 2012 (DE) .......................... 10 2012 107 544

(51) Int. Cl.
| | | |
|---|---|---|
| *G01B 11/14* | (2006.01) | |
| *G01C 3/08* | (2006.01) | |
| *G01B 11/02* | (2006.01) | |
| *G01S 17/95* | (2006.01) | |
| *G01S 17/42* | (2006.01) | |
| *G01S 7/481* | (2006.01) | |
| *F16H 1/28* | (2006.01) | |

(52) U.S. Cl.
CPC .................. *G01B 11/02* (2013.01); *G01S 17/95* (2013.01); *G01S 17/42* (2013.01); *G01S 7/4817* (2013.01); *F16H 2001/2872* (2013.01)
USPC ........... 356/614; 356/4.01; 356/5.01; 356/5.1

(58) Field of Classification Search
CPC ....... G01S 17/89; G01S 17/42; G01S 7/4817; G01S 7/497; G01C 15/002; G01B 11/026; G01B 11/24; G01B 5/20
USPC ............. 356/601–623, 4.01, 3.09, 4.03, 4.08, 356/5.1, 5.01
See application file for complete search history.

(56) References Cited

U.S. PATENT DOCUMENTS

| | | |
|---|---|---|
| 3,447,852 A | 6/1969 | Barlow |
| 3,830,567 A | 8/1974 | Riegl |

(Continued)

FOREIGN PATENT DOCUMENTS

| | | |
|---|---|---|
| AT | 508635 A1 | 3/2011 |
| AU | 2005200937 A1 | 9/2006 |

(Continued)

OTHER PUBLICATIONS

Chinese Notification of First Office Action for Chinese Application No. 201080003463.3; Issued Oct. 30, 2012 (translated).

(Continued)

*Primary Examiner* — Hoa Pham
(74) *Attorney, Agent, or Firm* — Cantor Colburn LLP (57) ABSTRACT

A laser scanner optically scans and measures an environment, the laser scanner having a base resting in the stationary reference system of the laser scanner, a measuring head rotatable about a vertical axis relative to the base, a measuring head rotatable relative to the base about a vertical axis, a motor supported in the measuring head, the motor having a motor shaft and a gear which, when driven by the motor by the motor shaft, turns the measuring head relative to the base, the gear being configured as a planetary gear.

8 Claims, 3 Drawing Sheets

(56) References Cited

U.S. PATENT DOCUMENTS

| | | | |
|---|---|---|---|
| 3,899,145 A | 8/1975 | Stephenson | |
| 3,945,729 A | 3/1976 | Rosen | |
| 4,733,961 A | 3/1988 | Mooney | |
| 4,736,218 A | 4/1988 | Kutman | |
| 4,984,881 A | 1/1991 | Osada et al. | |
| 4,999,491 A | 3/1991 | Semler et al. | |
| 5,155,684 A | 10/1992 | Burke et al. | |
| 5,168,532 A | 12/1992 | Seppi et al. | |
| 5,218,427 A | 6/1993 | Koch | |
| 5,313,261 A | 5/1994 | Leatham et al. | |
| 5,329,347 A | 7/1994 | Wallace et al. | |
| 5,329,467 A | 7/1994 | Nagamune et al. | |
| 5,371,347 A * | 12/1994 | Plesko | 235/462.15 |
| 5,402,365 A | 3/1995 | Kozikaro et al. | |
| 5,446,846 A | 8/1995 | Lennartsson | |
| 5,517,297 A | 5/1996 | Stenton | |
| 5,629,756 A | 5/1997 | Kitajima | |
| 5,675,326 A | 10/1997 | Juds et al. | |
| 5,677,760 A * | 10/1997 | Mikami et al. | 356/3.04 |
| 5,734,417 A | 3/1998 | Yamamoto et al. | |
| 5,745,225 A | 4/1998 | Watanabe et al. | |
| 5,793,993 A | 8/1998 | Broedner et al. | |
| 5,894,123 A | 4/1999 | Ohtomo et al. | |
| 5,898,490 A | 4/1999 | Ohtomo et al. | |
| 5,933,267 A | 8/1999 | Ishizuka | |
| 5,936,721 A | 8/1999 | Ohtomo et al. | |
| 5,940,181 A | 8/1999 | Tsubono et al. | |
| 5,988,862 A | 11/1999 | Kacyra et al. | |
| 6,040,898 A | 3/2000 | Mrosik et al. | |
| 6,069,700 A | 5/2000 | Rudnick et al. | |
| 6,077,306 A | 6/2000 | Metzger et al. | |
| 6,149,112 A | 11/2000 | Thieltges | |
| 6,349,249 B1 | 2/2002 | Cunningham | |
| 6,445,446 B1 | 9/2002 | Kumagai et al. | |
| 6,480,270 B1 | 11/2002 | Studnicka et al. | |
| 6,483,106 B1 | 11/2002 | Ohtomo et al. | |
| 6,504,602 B1 | 1/2003 | Hinderling | |
| 6,512,575 B1 | 1/2003 | Marchi | |
| 6,650,402 B2 | 11/2003 | Sullivan et al. | |
| 6,675,122 B1 | 1/2004 | Markendorf et al. | |
| 6,710,859 B2 | 3/2004 | Shirai et al. | |
| 6,750,873 B1 | 6/2004 | Bernardini et al. | |
| 6,825,923 B2 | 11/2004 | Hamar et al. | |
| 6,856,381 B2 | 2/2005 | Christoph | |
| 6,917,415 B2 | 7/2005 | Gogolla et al. | |
| 6,965,843 B2 | 11/2005 | Raab et al. | |
| 7,029,126 B2 | 4/2006 | Tang | |
| 7,069,124 B1 | 6/2006 | Whittaker et al. | |
| 7,076,420 B1 | 7/2006 | Snyder et al. | |
| 7,127,822 B2 | 10/2006 | Kumagai et al. | |
| 7,140,213 B2 | 11/2006 | Feucht et al. | |
| 7,190,465 B2 | 3/2007 | Froehlich et al. | |
| 7,193,690 B2 | 3/2007 | Ossig et al. | |
| 7,285,793 B2 | 10/2007 | Husted | |
| 7,352,446 B2 | 4/2008 | Bridges et al. | |
| 7,400,384 B1 | 7/2008 | Evans et al. | |
| 7,430,068 B2 | 9/2008 | Becker et al. | |
| 7,515,256 B2 | 4/2009 | Ohtomo et al. | |
| 7,541,830 B2 | 6/2009 | Fahrbach et al. | |
| 7,659,995 B2 | 2/2010 | Knighton et al. | |
| 7,733,544 B2 | 6/2010 | Becker et al. | |
| 7,787,670 B2 | 8/2010 | Urushiya | |
| 7,798,453 B2 | 9/2010 | Maningo et al. | |
| 7,834,985 B2 | 11/2010 | Morcom | |
| 7,847,922 B2 * | 12/2010 | Gittinger et al. | 356/4.01 |
| 7,869,005 B2 | 1/2011 | Ossig et al. | |
| 7,900,714 B2 * | 3/2011 | Milbourne et al. | 173/47 |
| 7,935,928 B2 | 5/2011 | Serger et al. | |
| 7,994,465 B1 | 8/2011 | Bamji et al. | |
| 7,995,834 B1 | 8/2011 | Knighton et al. | |
| 8,020,657 B2 | 9/2011 | Allard et al. | |
| 8,117,668 B2 | 2/2012 | Crampton et al. | |
| 8,152,071 B2 | 4/2012 | Doherty et al. | |
| 8,269,984 B2 * | 9/2012 | Hinderling et al. | 356/614 |
| 8,310,653 B2 | 11/2012 | Ogawa et al. | |
| 8,384,914 B2 * | 2/2013 | Becker et al. | 356/614 |
| 8,659,752 B2 | 2/2014 | Cramer et al. | |
| 2002/0059042 A1 | 5/2002 | Kacyra et al. | |
| 2002/0143506 A1 | 10/2002 | D'Aligny et al. | |
| 2002/0149694 A1 | 10/2002 | Seo | |
| 2002/0176097 A1 * | 11/2002 | Rodgers | 356/630 |
| 2003/0043386 A1 | 3/2003 | Froehlich et al. | |
| 2003/0090646 A1 | 5/2003 | Riegl et al. | |
| 2003/0137449 A1 | 7/2003 | Vashisth et al. | |
| 2003/0179361 A1 | 9/2003 | Ohtomo et al. | |
| 2004/0004727 A1 | 1/2004 | Yanagisawa et al. | |
| 2004/0027554 A1 | 2/2004 | Ishinabe et al. | |
| 2004/0158355 A1 | 8/2004 | Holmqvist et al. | |
| 2004/0179570 A1 | 9/2004 | Vitruk et al. | |
| 2004/0221790 A1 | 11/2004 | Sinclair et al. | |
| 2004/0246462 A1 | 12/2004 | Kaneko et al. | |
| 2005/0046823 A1 | 3/2005 | Ando et al. | |
| 2005/0111514 A1 | 5/2005 | Matsumoto et al. | |
| 2005/0141052 A1 | 6/2005 | Becker et al. | |
| 2005/0172503 A1 | 8/2005 | Kumagai et al. | |
| 2005/0190384 A1 | 9/2005 | Persi et al. | |
| 2006/0061566 A1 | 3/2006 | Verma et al. | |
| 2006/0088044 A1 | 4/2006 | Hammerl | |
| 2006/0109536 A1 | 5/2006 | Mettenleiter et al. | |
| 2006/0193521 A1 | 8/2006 | England, III et al. | |
| 2006/0241791 A1 | 10/2006 | Pokorny et al. | |
| 2007/0058154 A1 | 3/2007 | Reichert et al. | |
| 2007/0064976 A1 | 3/2007 | England, III | |
| 2007/0100498 A1 | 5/2007 | Matsumoto et al. | |
| 2007/0118269 A1 | 5/2007 | Gibson et al. | |
| 2007/0122250 A1 | 5/2007 | Mullner | |
| 2007/0150111 A1 | 6/2007 | Wu et al. | |
| 2007/0171394 A1 | 7/2007 | Steiner et al. | |
| 2007/0181685 A1 | 8/2007 | Zhu et al. | |
| 2007/0229929 A1 | 10/2007 | Soreide et al. | |
| 2008/0052808 A1 | 3/2008 | Leick et al. | |
| 2008/0075326 A1 | 3/2008 | Otani et al. | |
| 2008/0154538 A1 | 6/2008 | Stathis | |
| 2008/0273758 A1 | 11/2008 | Fuchs et al. | |
| 2008/0309546 A1 | 12/2008 | Wakayama et al. | |
| 2009/0021351 A1 | 1/2009 | Beniyama et al. | |
| 2009/0046752 A1 | 2/2009 | Bueche et al. | |
| 2009/0051938 A1 | 2/2009 | Miousset et al. | |
| 2009/0095047 A1 | 4/2009 | Patel et al. | |
| 2009/0100949 A1 | 4/2009 | Shirai et al. | |
| 2009/0133494 A1 | 5/2009 | Van Dam et al. | |
| 2009/0161091 A1 | 6/2009 | Yamamoto | |
| 2009/0185741 A1 | 7/2009 | Nahari et al. | |
| 2009/0323742 A1 | 12/2009 | Kumano | |
| 2010/0030421 A1 | 2/2010 | Yoshimura et al. | |
| 2010/0049891 A1 | 2/2010 | Hartwich et al. | |
| 2010/0134596 A1 | 6/2010 | Becker | |
| 2010/0195086 A1 | 8/2010 | Ossig et al. | |
| 2010/0277472 A1 | 11/2010 | Kaltenbach et al. | |
| 2010/0318319 A1 | 12/2010 | Maierhofer | |
| 2011/0025905 A1 | 2/2011 | Tanaka | |
| 2011/0066781 A1 | 3/2011 | Debelak et al. | |
| 2012/0035788 A1 | 2/2012 | Trepagnier et al. | |
| 2012/0035798 A1 | 2/2012 | Barfoot et al. | |
| 2012/0046820 A1 | 2/2012 | Allard et al. | |
| 2012/0069325 A1 * | 3/2012 | Schumann et al. | 356/51 |
| 2012/0070077 A1 * | 3/2012 | Ossig et al. | 382/164 |
| 2012/0140244 A1 * | 6/2012 | Gittinger et al. | 356/612 |
| 2012/0154786 A1 * | 6/2012 | Gosch et al. | 356/5.01 |
| 2012/0155744 A1 | 6/2012 | Kennedy et al. | |
| 2012/0169876 A1 | 7/2012 | Reichert et al. | |
| 2012/0229788 A1 * | 9/2012 | Schumann et al. | 356/4.01 |
| 2012/0262700 A1 * | 10/2012 | Schumann et al. | 356/4.01 |
| 2012/0287265 A1 * | 11/2012 | Schumann et al. | 348/135 |
| 2013/0010307 A1 * | 1/2013 | Greiner et al. | 356/601 |
| 2013/0070250 A1 * | 3/2013 | Ditte et al. | 356/445 |
| 2013/0094024 A1 * | 4/2013 | Ruhland et al. | 356/402 |
| 2013/0201487 A1 * | 8/2013 | Ossig et al. | 356/601 |

FOREIGN PATENT DOCUMENTS

| | | |
|---|---|---|
| CN | 1735789 | 2/2006 |
| CN | 1838102 A | 9/2006 |
| DE | 2216765 A1 | 4/1972 |

(56) References Cited

FOREIGN PATENT DOCUMENTS

| | | |
|---|---|---|
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 4412044 | 10/1995 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10137241 A1 | 9/2002 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10326848 | 1/2005 |
| DE | 10361870 A1 | 7/2005 |
| DE | 102004015111 A1 | 10/2005 |
| DE | 102004028090 A1 | 12/2005 |
| DE | 202006005643 U1 | 8/2006 |
| DE | 102005056265 A1 | 5/2007 |
| DE | 102006053611 A1 | 5/2007 |
| DE | 102006024534 A1 | 11/2007 |
| DE | 102007037162 A1 | 2/2009 |
| DE | 102008014274 A1 | 8/2009 |
| DE | 102009035336 B3 | 11/2010 |
| DE | 102010032725 A1 | 1/2012 |
| DE | 202011051975 U1 | 2/2013 |
| EP | 0667549 A2 | 8/1995 |
| EP | 0727642 A1 | 8/1996 |
| EP | 0838696 A1 | 4/1998 |
| EP | 0949524 A1 | 10/1999 |
| EP | 1056987 A1 | 6/2000 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 2336493 A | 10/1999 |
| GB | 2388661 A | 11/2003 |
| GB | 2447258 A | 9/2008 |
| JP | 61062885 | 3/1986 |
| JP | H0357911 A | 3/1991 |
| JP | H04115108 A | 4/1992 |
| JP | 04225188 | 8/1992 |
| JP | H04267214 A | 9/1992 |
| JP | H0572477 A | 3/1993 |
| JP | 06341838 | 12/1994 |
| JP | 07128051 A | 5/1995 |
| JP | H07229963 A | 8/1995 |
| JP | 0821714 A | 1/1996 |
| JP | H0815413 A | 1/1996 |
| JP | H08129145 A | 5/1996 |
| JP | H08136849 A | 5/1996 |
| JP | H08262140 A | 10/1996 |
| JP | 1123993 A | 1/1999 |
| JP | 2000121724 A | 4/2000 |
| JP | 2000249546 A | 9/2000 |
| JP | 2000339468 A | 12/2000 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003202215 A | 7/2003 |
| JP | 2004109106 A | 4/2004 |
| JP | 2004245832 A | 9/2004 |
| JP | 2004348575 A | 12/2004 |
| JP | 2005055226 A | 3/2005 |
| JP | 2005069700 A | 3/2005 |
| JP | 2005174887 | 6/2005 |
| JP | 2005215917 A | 8/2005 |
| JP | 2005257510 | 9/2005 |
| JP | 2006038683 A | 2/2006 |
| JP | 2006102176 | 4/2006 |
| JP | 2006266821 | 10/2006 |
| JP | 2007514943 | 6/2007 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2008304220 | 12/2008 |
| JP | 2009063339 A | 3/2009 |
| JP | 2009541758 A | 11/2009 |
| JP | 2010169405 A | 8/2010 |
| WO | 8905512 | 6/1989 |
| WO | 9711399 | 3/1997 |
| WO | 0020880 A2 | 4/2000 |
| WO | 0026612 | 5/2000 |
| WO | 0063645 | 10/2000 |
| WO | 0063681 A2 | 10/2000 |
| WO | 02084327 A2 | 10/2002 |
| WO | 2005008271 A2 | 1/2005 |
| WO | 2005059473 A2 | 6/2005 |
| WO | 2006000552 A1 | 1/2006 |
| WO | 2006014445 A1 | 2/2006 |
| WO | 2006053837 A1 | 5/2006 |
| WO | 2007012198 A1 | 2/2007 |
| WO | 2007051972 A1 | 5/2007 |
| WO | 2007087198 A1 | 8/2007 |
| WO | 2007118478 A1 | 10/2007 |
| WO | 2008019856 A1 | 2/2008 |
| WO | 2008048424 A2 | 4/2008 |
| WO | 2008068791 A1 | 6/2008 |
| WO | 2009053085 A1 | 4/2009 |
| WO | 2009095384 A2 | 8/2009 |
| WO | 2009123278 A1 | 10/2009 |
| WO | 2010108644 A1 | 9/2010 |
| WO | 2011021103 A1 | 2/2011 |
| WO | 2011029140 A1 | 3/2011 |
| WO | 2012037157 A2 | 3/2012 |
| WO | 2012013525 A2 | 8/2012 |
| WO | 2012112683 A2 | 8/2012 |

OTHER PUBLICATIONS

Chinese Office Action for Chinese Application Serial No. 201080047516-1; Date of Issue Apr. 1, 2013.
Germany Office Action for DE Application No. 10 2012 107 544.1; Issued Jan. 2, 2013.
GB Examination Report dated Mar. 27, 2013 for GB Application No. GB1303390.7.
GB Examination Report dated Mar. 27, 2013 for GB Application No. GB1303382.4.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
International Search Report of the International Searching Authority for Application No. PCT/EP2011/003264; Date of Mailing Oct. 19, 2011.
International Search Report of the International Searching Authority for PCT/EP2010/006866; Date of Mailing Mar. 14, 2011.
International Search Report of the International Searching Authority for PCT/EP2010/006868; Date of Mailing Mar. 14, 2011.
International Search Report of the International Searching Authority for PCT/EP2009/050888; Date of Mailing Sep. 15, 2009.
International Search Report of the International Searching Authority for Application No. PCT/US2012/075178; Date of Mailing Apr. 9, 2013.
International Search Report of the International Searching Authority for PCT/EP2009/050887; Date of Mailing May 14, 2009.
International Search Report of the International Searching Authority for Application No. PCT/EP2011/003262; Date of Mailing Sep. 30, 2011.
Langford, et al., "Practical Skills in Forensic Science", Pearson Education Limited, Essex, England, First Published 2005, Forensic Chemistry.

(56) References Cited

OTHER PUBLICATIONS

Leica Geosystems, TruStory Forensic Analysis by Albuquerque Police Department, 2006.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2011] the whole document.
Merriam-Webster (m-w.com), "Interface". 2012. http://www.merriam-webster.com/dictionary/interface.
Merriam-Webster (m-w.com), "Traverse". 2012. http://www.merriam-webster.com/dictionary/traverse.
Merriam-Webster (m-w.com), "Parts". 2012. http://www.merriam-webster.com/dictionary/parts.
Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http://scitation.aip.org/getpdf/servlet/GetPDFServlet?filetype=pdf&id=PSISDG002059000001000316000001&idtype=cvips&doi=10.117/12.150236&prog=normal>[retrieved on Mar. 8, 2011] the whole document.
"Scanner Basis Configuration for Riegl VQ-250", Riegl Company Webpage, Feb. 16, 2011, XP002693900, Retrieved from the internet: URL:http://www.riegl.com/uploads/tx_pxpriegldownloads/30_SystemConfiguration_VQ-250_02-11_16-02-2011.pdf [retrieved on Mar. 15, 2013] the whole document.
Se, et al., "Instant Scene Modeler for Crime Scene Reconstruction", MDA, Space Missions, Ontario, Canada, Copyright 2005, IEEE.
The Scene, Journal of the Association for Crime Scene Reconstruction, Apr.-Jun. 2006, vol. 12, Issue 2.
Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE Xplore].
Williams, J.A., et al., Evaluation of a Novel Multiple Point Set Registration Algorithm, Copyright 2000, [Retrieved on Jan. 18, 2010 at 04:10 from IEEE Xplore].
Written Opinion of the International Searching Authority for International Patent Application PCT/EP2010/006867; mailing date Mar. 18, 2011.
Written Opinion of the International Searching Authority for Application No. PCT/EP2006/003010; Date of Mailing Dec. 11, 2006.
Written Opinion of the International Searching Authority for Application No. PCT/EP2011/001662; Date of Mailing May 26, 2011.
Written Opinion of the International Searching Authority for Application No. PCT/US2012/075178; Date of Mailing Apr. 9, 2013.
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.
Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI: 10.3929/ethz-a-004656666.
Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77, XP002590306.
Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US., vol. 2, May 21, 2001, pp. 2045-2050, XP010550445, DOI: 10.1109/ROBOT.2001.932908 ISBN: 978-0-7803-6576-6, the whole document.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Conference on Intelligent Robots and Systems], New York, NY: IEEE, US, vol. 1, Oct. 27, 2003; pp. 188-193, XP010672337, DOI:10.1109/IROS.2003.1250626; ISBN: 978-0-7803-7860-5, p. 189; Figure 1.
Chinese Office Action Dated Jun. 2, 2010 with English Translation of the Text for Application No. 2006800540959.
First Office Action and Search Report with English Translation for Chinese Patent Application No. 201080003456.3; Issue Date Jan. 17, 2013.
First Chinese Office Action for Application No. 201080003467.1; Office Action Issue Date Feb. 5, 2013; (translated).
Chinese Publication No. CN 1445509, published Oct. 1, 2003—English Abstract Not Available; EP Equivalent 1347267.
Ingensand, H., Dr., "Introduction to Geodetic Metrology", "Einfuhrung in die Geodatische Messtechnik", Federal Institute of Technology Zurich, Edition 2004, p. 16.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354, XP002587995, Proceedings of the SPIE.
FARO Laserscanner LS, Presentation Forensic Package, Policeschool of Hessen, Wiesbaden, Germany, Dec. 14, 2005; FARO Technologies, Copyright 2008.
FARO Laser Scanner LS, Recording Reality's Digital Fingerprint, The Measure of Success, Copyright 2005.
Leica Geosystems, FBI Crime Scene Case Study, Cited in Opposition of EP Application No. 07785873.6 in Oral Proceedings held on Jun. 27, 2013, Munchen, Germany; D13, p. 5 of Summons, Tony Grissim, Feb. 2006.
Godin, G., et al., A Method for the Registration of Attributed Range Images, Copyright 2001, [Retrieved on Jan. 18, 2010 at 03:29 from IEEE Xplore].
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.
Howard, et al., "Virtual Environments for Scene of Crime Reconstruction and Analysis", Advanced Interfaces Group, Department of Computer Science, University of Manchester, Manchester, UK, Feb. 28, 2000.
International Preliminary Report and Written Opinion for International Application No. PCT/EP2007/005789; Date of Mailing Oct. 30, 2007.
International Preliminary Report on Patentability and Written Opinion for PCT/IB2010/002216; Date of Issuance Jan. 24, 2012.
International Preliminary Report on Patentability and Written Opinion for PCT/EP2009/050887; Date of Issue Sep. 7, 2010.
International Preliminary Report on Patentability and Written Opinion for International Patent Application PCT/IB2010/002226; Date of Issuance Jan. 24, 2012.
International Preliminary Report on Patentability and Written Opinion for PCT/EP2004/014605; Date of Issue Aug. 29, 2006.
International Preliminary Report on Patentability and Written Opinion for PCT/EP2010/001779; Date of Issuance Sep. 27, 2011.
International Preliminary Report on Patentability and Written Opinion for PCT/IB2010/002258; Date of Issuance Feb. 21, 2012.
International Preliminary Report on Patentability for International Application Serial No. PCT/EP2011/003261. International filing date Jul. 1, 2011. Date of Issuance Jan. 29, 2013.
International Preliminary Report on Patentability for International Application Serial No. PCT/EP2011/003262. International filing date Jul. 1, 2011. Date of Issuance Jan. 29, 2013.
International Preliminary Report on Patentability for International Application Serial No. PCT/EP2011/003263. International filing date Jul. 1, 2011. Date of Issuance Jan. 29, 2013.
International Preliminary Report on Patentability for International Application Serial No. PCT/EP2011/003264. International filing date Jul. 1, 2011. Date of Issuance Jan. 29, 2013.
International Preliminary Report on Patentability and Written Opinion for PCT/EP2010/006866; Date of Issuance May 22, 2012.

(56) References Cited

OTHER PUBLICATIONS

International Preliminary Report on Patentability and Written Opinion for PCT/EP2010/006867; Date of Issuance May 22, 2012.
iQsun Laserscanner Brochure, 2 Pages, Apr. 2005.
International Preliminary Report on Patentability and Written Opinion for PCT/EP2009/050888; Date of Issuance Sep. 7, 2010.
International Preliminary Report on Patentability and Written Opinion for PCT/EP2010/001780; Date of Issuance Sep. 27, 2011.
International Preliminary Report on Patentability and Written Opinion for PCT/EP2010/001781; Date of Issuance Sep. 27, 2011.
International Preliminary Report on Patentability and Written Opinion for PCT/EP2010/006868; Date of Issuance May 22, 2012.
International Preliminary Report on Patentability and Written Opinion for PCT/EP2009/009174; Date of Issuance Aug. 16, 2011.
International Search Report and Written Opinion for PCT/EP2009/009174; Date of Mailing May 25, 2010.
International Search Report of the International Searching Authority for PCT/IB2010/002216; Date of Mailing Feb. 3, 2011.
International Search Report of the International Searching Authority for PCT/EP2007/005789; Date of Mailing Oct. 30, 2007.
International Search Report of the International Searching Authority for PCT/IB2010/002226; Date of Mailing Dec. 13, 2010.
International Search Report of the International Searching Authority for PCT/EP2004/014605; Date of Mailing Apr. 15, 2005.
International Search Report of the International Searching Authority for PCT/EP2006/003010; Date of Mailing Nov. 12, 2006.
International Search Report of the International Searching Authority for PCT/EP2010/001779; Date of Mailing Jul. 20, 2010.
International Search Report of the International Searching Authority for PCT/EP2010/001780; Date of Mailing Jul. 23, 2010.
International Search Report of the International Searching Authority for PCT/EP2010/001781; Date of Mailing Jul. 22, 2010.
International Search Report of the International Searching Authority for Application No. PCT/EP2011/001662; Date of Mailing May 26, 2011.
International Search Report of the International Searching Authority for PCT/IB2010/002258; Date of Mailing Jan. 28, 2011.
International Search Report of the International Searching Authority for Application No. PCT/EP2011/003261; Date of Mailing Oct. 17, 2011.
International Search Report of the International Searching Authority for Application No. PCT/EP2011/003263; Date of Mailing Oct. 19, 2011.
International Search Report of the International Searching Authority for PCT/EP2010/006867; Date of Mailing Mar. 18, 2011.
First Chinese Office Action for Chinese Patent Applicaiton No. 2013082200801190; Dated Aug. 27, 2013.
Japanese Office Action for Japanese Patent Application No. 2012501176; Dated Aug. 27, 2013.
Japanese Office Action for Japanese Patent Application No. 2012-534588; Date of Mailing Sep. 17, 2013.
Second Office Action with English Translation for Chinese Patent Application No. 201080003466.7; Issue Date Jul. 19, 2013.
German Office Action for DE Application Serial No. 102012109481.0; dated Aug. 1, 2013.
Japanese Office Action for JP Application Serial No. 2013-520990; Date of Mailing Jul. 2, 2013.
GB Examination Report dated Jun. 19, 2013 for GB Application No. GB1202398.2.
GB Examination Report dated Aug. 15, 2013 for GB Application No. GB 1303382.4.
GB Examination Report dated Aug. 7, 2013 for GB Application No. GB1303390.7.
Japanese Office Action for JP Application No. 2012-534589; issued Jul. 30, 2013.
Japanese Office Action for Application Serial No. 2013-520987; Date of Mailing Jul. 2, 2013.
Japanese Office Action for Application Serial No. 2013-520989; Date of Mailing Jul. 2, 2013.
Japanese Office Action for Application Serial No. 2012-534590; Date of Mailing Jul. 30, 2013.
Japanese Office Action for JP Application Serial No. 2012-501175; Date of Mailing Jul. 16, 2013.
Second German Office Action for DE Application Serial No. 10 2009 015 922.3; Dated Dec. 2, 2013.
German Office Acton for DE Application No. 102013102.554.4; Dated Jan. 9, 2014.
Germany Office Action for DE Application No. 10 2012 107 544.1; Issued Feb. 1, 2013.
GB Exam and Search Report for Application No. GB1314371.4; Dated Nov. 22, 2013.
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Second JP Office Action for JP Patent Application Serial No. 2012-534590; Date of Mailing Nov. 12, 2013.
Japanese Office Action for JP Patent Application Serial No. 2012-501174; Dated Oct. 29, 2013.
GB Application No. GB1220971.4 Examination Report dated May 20, 2014.
English translation of JP Office Action for Application No. 2012-521117, issued Mar. 25, 2014.
English translation of JP Office Action for Application No. 2012-525222, issued Apr. 2, 2014.

* cited by examiner

DEVICE FOR OPTICALLY SCANNING AND MEASURING AN ENVIRONMENT

CROSS-REFERENCE TO RELATED APPLICATIONS

The present application is a Non-Provisional Application of U.S. Provisional Patent Application Ser. No. 61/714,773, filed on Oct. 17, 2012, which claims the benefit of German Patent Application No. DE 102012107544.1, filed on Aug. 17, 2012, and which are hereby incorporated by reference.

BACKGROUND OF THE INVENTION

The invention relates to a device for optically scanning and measuring an environment.

By a laser scanner device such as is known from German Patent Application No. DE 10 2010 032 725, the environment of the laser scanner can be optically scanned and measured. The laser scanner has a pre-assembled pivot-axis module that is provided with a base which rests in a stationary reference system of the laser scanner and with parts that are fixed to a support structure of a measuring head which is rotatable relative to the base. A motor is provided for driving the measuring head, the motor being arranged outside the pivot-axis module. Through use of a horizontally arranged worm, the motor acts upon a worm wheel of the pivot-axis module.

SUMMARY OF THE INVENTION

Embodiments of the present invention are based on improving a laser scanner device of the type mentioned hereinabove in the introduction, in particular of reducing the installation space required.

Through use of a planetary gear, the drive motor of the measuring head can be configured in a relatively more compact manner. In particular, a construction saving installation space is possible, for example by a vertical motor shaft and by rotational axes of the planet wheel which are parallel to the motor shaft and/or by an integration of the motor in a pivot-axis module, as it is used in the known device. A relatively larger transmission ratio compared to a worm gear is obtained by use of two differently configured hollow wheels. With the larger transmission ratio it is also possible to use a relatively more low-powered motor which saves weight, installation space, energy and costs, and which compensates for the lower power by a higher rotational speed. Sun wheel, planet wheels and hollow wheels each can be made from plastics material, so that the planetary gear can also save weight and costs.

The terms "horizontal" and "vertical" are used in relation to the geometry of the laser scanner. It is assumed that the direction of the weight corresponds to the "vertical" direction, i.e., the laser scanner is on a horizontal plane. The laser scanner can, however, also be slightly inclined, for example up to 15° with respect to the horizontal and/or vertical direction, i.e., the rotational axes of measuring head and mirror are inclined correspondingly, without problems occurring in carrying out the scan or its evaluation. The terms "horizontal and "vertical" are therefore to be intended to be generalized.

The invention is explained in more detail below on the basis of an exemplary embodiment illustrated in the drawing, in which.

DETAILED DESCRIPTION OF THE INVENTION

Figure 1:
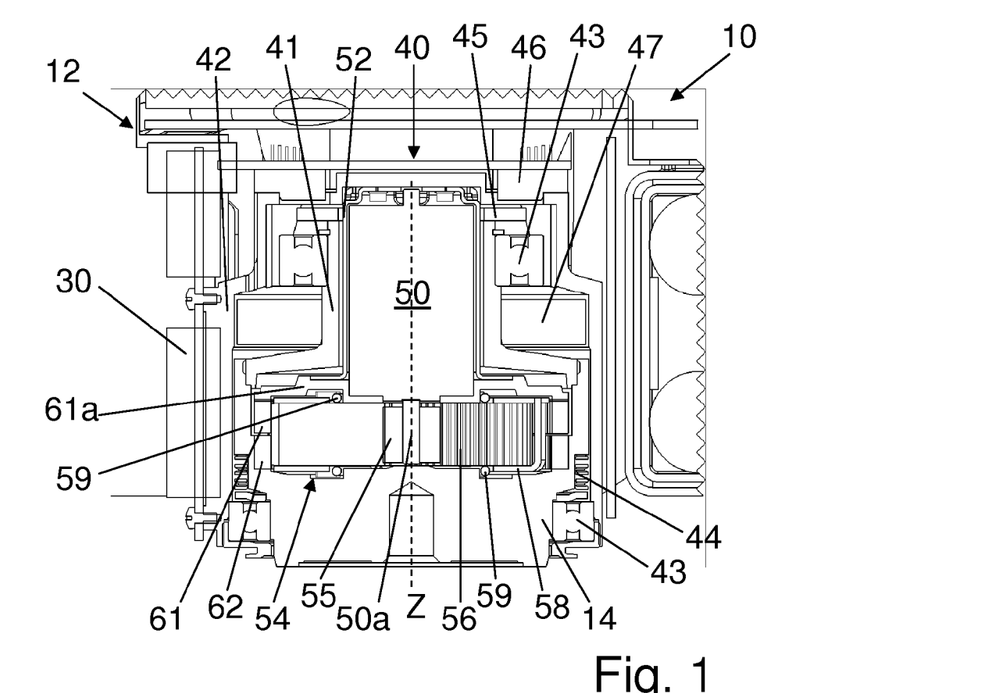
FIG. 1 is a partially sectional view of a laser scanner.
Figure 2:
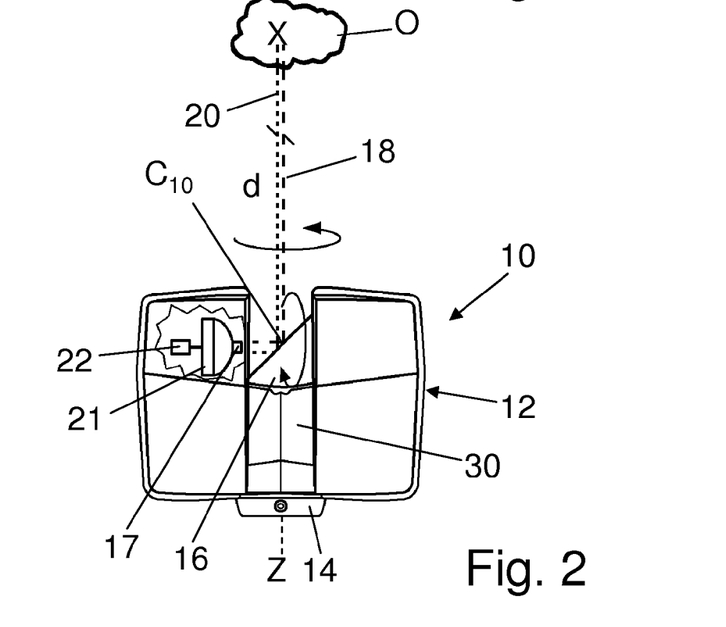
FIG. 2 is a schematic illustration of the laser scanner of FIG. 1 in operation.
Figure 3:
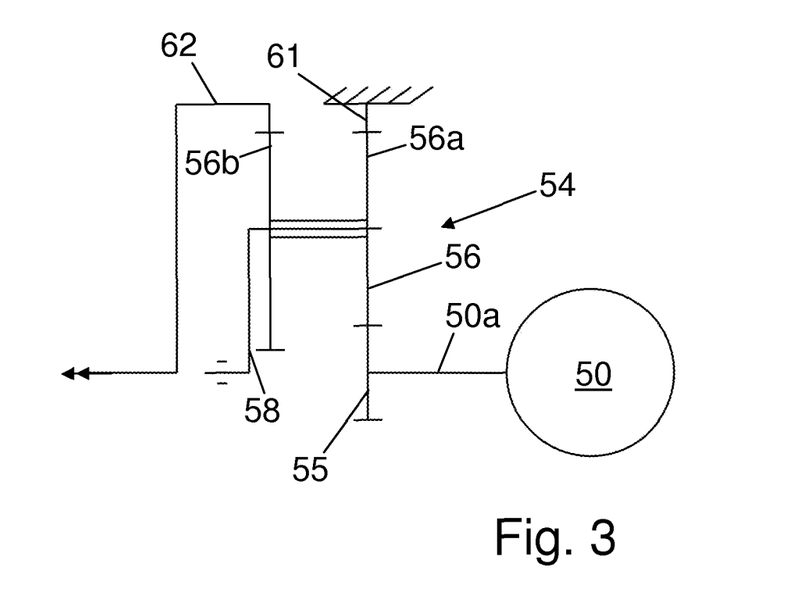
FIG. 3 is a schematic illustration of a planetary gear.
Figure 4:
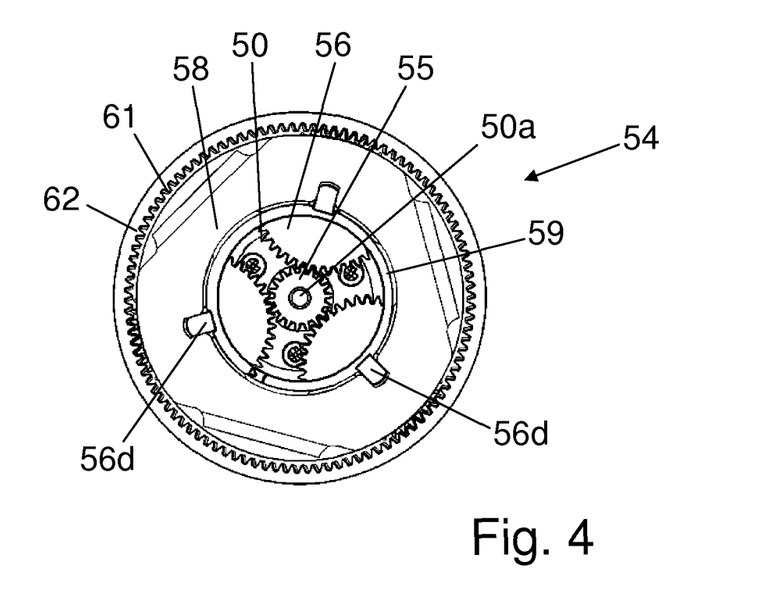
FIG. 4 is a bottom view of the planetary gear.
Figure 5:
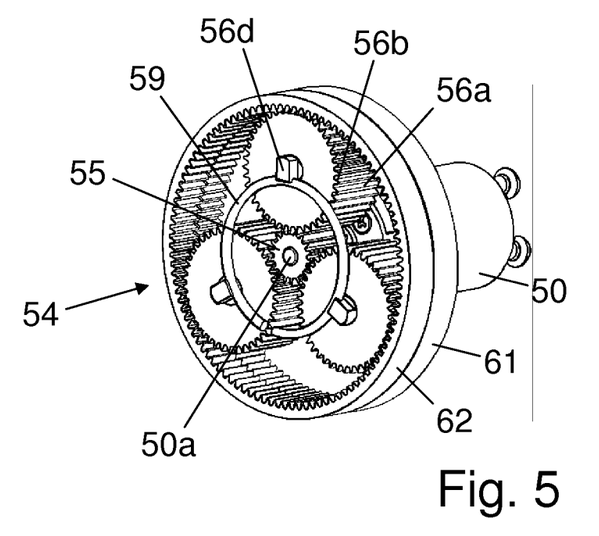
FIG. 5 is a perspective illustration of the planetary gear without a planet carrier.
Figure 6:
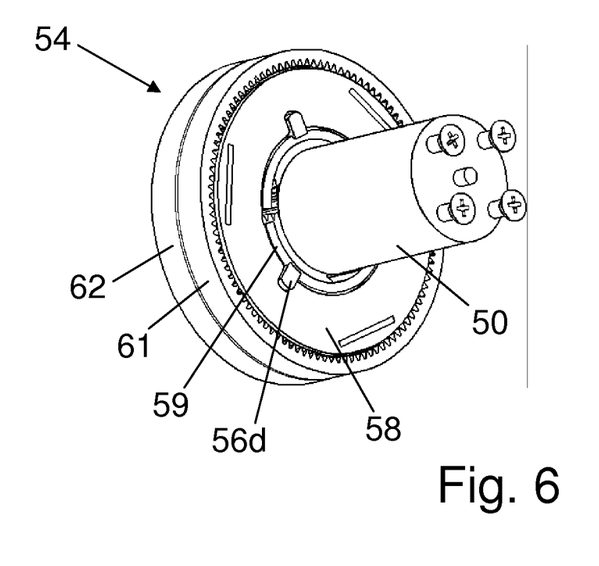
FIG. 6 is a further perspective illustration of the planetary gear with the planet carrier.

Referring to FIGS. 1 and 2, a laser scanner 10 is provided as a device for optically scanning and measuring an environment of the laser scanner 10. The laser scanner 10 has a measuring head 12 and a base 14. The measuring head 12 is mounted on the base 14 as a unit that can be rotated about a vertical axis Z. The measuring head 12 has a mirror 16, which can be rotated about a horizontal axis. The intersection point of the two receiving slot axes is designated as the center $C_{10}$ of the laser scanner 10.

The measuring head 12 is further provided with a light emitter 17 for emitting an emission light beam 18. The emission light beam 18 may be a laser beam in the range of approximately 300 to 1600 nm wave length, for example 790 nm, 905 nm or less than 400 nm. However, other electromagnetic waves having, for example, a greater wave length can be used. The emission light beam 18 may be amplitude-modulated with a modulation signal. The emission light beam 18 is emitted by the light emitter 17 onto the rotary mirror 16, where it is deflected and emitted to the environment. A reception light beam 20, which is reflected in the environment by an object O or scattered otherwise, is captured again by the rotary mirror 16, deflected and directed onto a light receiver 21. The direction of the emission light beam 18 and of the reception light beam 20 results from the angular positions of the rotary mirror 16 and the measuring head 12, which depend on the positions of their corresponding rotary drives which, in turn, are registered by one encoder each.

A control and evaluation unit 22 has a data connection to the light emitter 17 and to the light receiver 21 in the measuring head 12, whereby parts of the unit 22 can be arranged also outside the measuring head 12, for example as a computer connected to the base 14. The control and evaluation unit 22 is configured to determine, for a multitude of measuring points X, the distance d between the laser scanner 10 and the illuminated point at the object O, from the propagation time of the emission light beam 18 and the reception light beam 20. For this purpose, the phase shift between the two light beams 18 and 20 can be determined and evaluated, for example.

Scanning takes place along a circle by means of the relatively quick rotation of the rotary mirror 16. By virtue of the relatively slow rotation of the measuring head 12 relative to the base 14, the entire space is scanned step by step, by the circles. The entity of measuring points X of such a measurement is designated as a scan. For such a scan, the center $C_{10}$ of the laser scanner 10 defines the origin of the local stationary reference system. The base 14 rests in this local stationary reference system.

In addition to the distance d to the center $C_{10}$ of the laser scanner 10, each measuring point X comprises a brightness information value that is determined by the control and evaluation unit 22. The brightness value is a gray-tone value which is determined, for example, by integration of the bandpass-filtered and amplified signal of the light receiver 21 over a measuring period which is assigned to the measuring point X. Through use of an optional color camera, pictures having color values (R, G, B) can be generated and assigned to the measuring points.

The laser scanner 10 has a support structure 30 which may comprise a metal material and which serves as a "skeleton" of the measuring head 12 and to which different components of the laser scanner 10 are fixed. The metal support structure 30 is, in an embodiment of the present invention, configured in one piece and made from aluminum. The support structure 30 has a receiving slot which is open at the bottom, into which a pivot-axis module 40 is inserted. The pivot-axis module 40 is a pre-assembled assembly which comprises parts which are fixed to the support structure 30 and is rotatable about the vertical axis Z relative thereto; i.e., the base 14 and parts which are fixed thereto. The indications of direction within the pivot-axis module 40 refer to this vertical axis Z; i.e., to the rotational axis between the support structure 30 and consequently the measuring head 12 and the base 14.

The base 14 has, on its upper end, a bowl-shaped area. A hollow pivot pin 41 protrudes upward from the base 14. In an embodiment of the present invention, the pivot pin 41 has a smaller diameter than the base 14, the pivot pin 41 being provided with a flange by which the pin 41 is fixed to the wall of the bowl-shaped area of the base 14. For reasons of manufacture, the base 14 and the pivot pin 41 are therefore separately configured components. In an alternative geometry, the pivot pin 41 and the base 14 can be configured together in one piece. The pivot-axis module 40 has a cup-shaped housing 42 which is open to the bottom. The housing 42 radially encloses the base 14 together with the pivot pin 41 and is rotatably mounted on the base 14 and pin 41 about the vertical axis Z. More specifically, The housing 42 is supported by one roller bearing 43 each (for example, a cross roller bearing) on the pivot pin 41 on top and on the base 14 on the bottom. Between the wall of the bowl-shaped area of the base 14 and the lower roller bearing 43, a compression spring 44 is located which is convoluted around the base 14, and which eliminates the axial backlash between the base 14 and the housing 42.

A horizontally arranged encoder disk 45, above which the housing 42 is provided with read heads 46, is fixed to the upper end of the pivot pin 41. Furthermore, slip rings 47 for the internal (i.e., taking place within the pivot-axis module 40) transmission of data and energy of the power supply are provided between the flange of the pivot pin 41 and a shoulder of the housing 42. Electric plug contacts of the pivot-axis module 40 for the transmission of data and energy from and to the measuring head 12 are provided on the upper end of the housing 42 and on the lower end of the base 14. The upper electric plug contacts are closed when the pivot-axis module 40 is introduced into the location slot of the support structure 30.

Inside the hollow pivot pin 41 a motor 50 with its motor holder 52 is arranged with a radial gap. The cup-shaped motor holder 52, which is open at the bottom, firmly receives the motor 50 and is fixed at its upper end to the housing 42. The motor 50, with its motor shaft 50a which is coaxial to the vertical axis Z, drives a two-stage planetary gear 54. In terms of space, the motor 50 and the planetary gear 54 are completely contained in the pivot-axis module 40.

Referring also to FIGS. 3-6, the planetary gear 54 has an externally toothed central sun gear 55 (as a drive for the planetary gear 54), which sits firmly on the motor shaft 50a. Three planet wheels 56 are arranged at regular intervals in the circumferential direction (i.e., offset by 120°) around the sun gear 55. The three externally toothed planet wheels 56 each mesh by a first toothing 56a with the sun gear 55, wherein they rotate about their planet-wheel rotational axis 56d each, which is parallel to the vertical axis Z. The three planet-wheel rotational axes 56d are guided by a planet carrier 58, whereby they can be shifted in the radial direction, in parallel to the vertical axis Z, the planet carrier 58 being provided with three radial slots or indentations for this purpose. On both ends of the planet-wheel rotational axes 56d, i.e., on both front ends of the planet carrier 58, a biased spring collar 59 is provided, for example a retaining ring. The two spring collars 59 load the three planet-wheel rotational axes 56d and consequently the three planet wheels 56 radially outwards.

The planet wheels 56 mesh by their first toothing 56a and also with a first hollow wheel 61 having an internal toothing. The first hollow wheel 61 is arranged concentrically to the vertical axis Z. Through use of a formed-on, or configured as a separate hollow-wheel support, flange 61a, the first hollow wheel 61 is connected with the motor holder 52, i.e., is fixed relative to the motor 50. If therefore the sun gear 55 drives the three planet wheels 56, the planet wheels 56 rotate about the sun gear 55, and the planet carrier 58 rotates about the vertical axis Z and leads the planet-wheels rotational axes 56d along a circle (i.e., on a cylinder surface).

A second hollow wheel 62 as output of the planetary gear 54 is arranged with an axial offset to the first hollow wheel 61, and concentrically to the vertical axis Z. The second hollow wheel 62 is formed on or fixed to the wall of the bowl-shaped area of the base 14, i.e., is rotatable relative to the motor 50. The first hollow wheel 61 and the second hollow wheel 62 are configured differently, for example having different dimensions with regard to the pitch diameter or to another diameter and/or provided with another number of teeth.

The planet wheels 56 mesh by a second toothing 56b with the second hollow wheel 62 having an internal toothing The second toothing 56b, in a relatively simple embodiment, is an axial extension of the first toothing 56a, but can be configured also in a different manner for example with regard to diameter and/or number of teeth. Due to the different configuration of the two hollow wheels 61 and 62, the rotation of the planet wheels 56 about the sun gear 55 leads to the generation of a relative rotation of the two hollow wheels 61 and 62.

The spring collars 59 eliminate the backlash between the planet wheels 56 and the hollow wheels 61 and 62. The transmission ratio of this relative rotation compared to the rotation of the sun gear 55 (i.e., of the motor shaft 50a) depends on the extent of the different configuration of the two hollow wheels 61 and 62, for example of the relative pitch-diameter difference and on the extent of the different configuration of the two toothings 56a and 56b of the planet wheels 56.

In the pivot-axis module 40, the pivot pin 41, the second hollow wheel 62 and the encoder disk 45 are assigned to the base 14 and fixed thereto, while, rotatably relative thereto, the housing 42, the first hollow wheel 61, the motor holder 52 bearing the motor 50 and the encoder read heads 46 are assigned to the measuring head 12 and fixed to the support structure 30 of the measuring head 12. If the motor 50 drives the planetary gear 54, a rotation of the measuring 12 relative to the base 14, about the vertical axis Z, is therefore generated.

The invention claimed is:

1. Device for optically scanning and measuring an environment, the device being configured as a laser scanner, the device comprising:
    a base which rests in a stationary reference system of the laser scanner;
    a measuring head which is rotatable relative to the base about a vertical axis;
    a motor which is supported in the measuring head, the motor having a motor shaft and a planetary gear which, when driven by the motor by the motor shaft, turns the measuring head relative to the base, wherein the motor shaft is coaxial to the vertical axis;
    the planetary gear comprises a sun wheel which is driven by the motor, and at least one planet wheel which meshes with the sun wheel;

the at least one planet wheel further meshes by a first toothing with a first hollow wheel, and by a second toothing with a second hollow wheel, wherein the first and second hollow wheels are configured in a different manner to cause relative rotation between the first and second hollow wheels in response to rotation of the at least one planet wheel about the sun wheel;

the measuring head and the base are configured relative to each other and to the first and second hollow wheels such that relative rotation between the first and second hollow wheels causes rotation of the measuring head relative to the base; and the measuring head comprising a light emitter configured to emit an emission light beam, a light receiver configured to receive a reception light beam which is reflected by an object in the environment of the laser scanner or scattered otherwise, and a control and evaluation unit which, for a multitude of measuring points, is configured to determine at least a distance to the object.

2. Device according to claim 1, wherein the laser scanner has a pivot-axis module, which, as a pre-assembled assembly is provided with the base and with parts which are to be fixed to a support structure of the measuring head.

3. Device according to claim 2, wherein the motor and the planetary gear are completely contained in the pivot-axis module.

4. Device according to claim 2, wherein the pivot-axis module is introduced in a receiving slot of the support structure.

5. Device according to claim 2, wherein the sun wheel is driven by the motor shaft, and the at least one planet wheel comprises several planet wheels which mesh with the sun wheel and are rotatably mounted on a planet carrier around planet-wheel rotational axes.

6. Device according to claim 5, wherein the several planet wheels mesh by the first toothing with the first hollow wheel, and by the second toothing with the second hollow wheel.

7. Device according to claim 6, wherein the first hollow wheel is assigned to the measuring head and is fixed in particular to a support structure of the measuring head, while the second hollow wheel is assigned to the base and is fixed thereto.

8. Device according to claim 5, wherein the planet-wheel rotational axes can be shifted and are loaded radially outwards relative to the planet carrier by at least one spring collar.

* * * * *